United States Patent [19]

Lesson

[11] Patent Number: 5,489,174
[45] Date of Patent: Feb. 6, 1996

[54] LOCKING SYSTEM FOR THREADED FASTENERS

[75] Inventor: Plato J. Lesson, Rockford, Ill.

[73] Assignee: Yonco Corporation, Rockford, Ill.

[21] Appl. No.: 286,548

[22] Filed: Aug. 5, 1994

[51] Int. Cl.$^6$ .................... F16B 39/04; F16B 39/20; F16G 11/00

[52] U.S. Cl. .................... 411/87; 411/361; 411/966; 403/212

[58] Field of Search .................... 411/87, 361, 966; 403/212, 316, 320; 29/433, 452, 516

[56] References Cited

U.S. PATENT DOCUMENTS

| | | | |
|---|---|---|---|
| 2,890,734 | 6/1959 | Mullin | 411/87 |
| 3,271,058 | 9/1966 | Anderson | 411/361 X |
| 3,797,947 | 3/1974 | Foote | 403/212 |
| 4,059,866 | 11/1977 | Rohland | 403/212 |
| 5,037,259 | 8/1991 | Duran et al. | 411/361 X |
| 5,052,094 | 10/1991 | Plasse et al. | 29/252 |
| 5,116,178 | 5/1992 | Lerman et al. | 411/87 |
| 5,127,144 | 7/1992 | Plasse et al. | 29/252 |
| 5,152,043 | 10/1992 | Plasse et al. | 29/252 |
| 5,167,059 | 12/1992 | Plasse et al. | 29/433 |
| 5,214,832 | 6/1993 | Koehler et al. | 29/268 |

OTHER PUBLICATIONS

"Maintainability/Human Factors Integral to Flight–Line Tool Design", article by Schmidt et al., pp. 18–21, Jetservice Fall/Winter 1992, Published by G.E.

Primary Examiner—Neill R. Wilson
Attorney, Agent, or Firm—Leydig, Voit & Mayer, Ltd.

[57] ABSTRACT

A locking system including a combination of a multi-strand locking wire and a ferrule having a thin walled crimpable section useful for preventing threaded fasteners from loosening due to vibration, each of the fasteners having an aperture for receiving the locking wire. The ferrule has a larger stop end for interfering with the fastener aperture and a smaller thin walled barrel end for crimping. In one configuration the ferrule is a thin walled cylinder with one end flared out to form the stop end for facilitating insertion of the locking wire. The thin wall of the barrel end allows reduced crimping force. Further reduction of crimping force is achieved by crimping the ferrule to deform only small localized areas on the barrel end. The ferrule may bear identification marks which may be either pre-marked or applied during the installation such as by crimping.

20 Claims, 4 Drawing Sheets

LOCKING SYSTEM FOR THREADED FASTENERS

FIELD OF THE INVENTION

The present invention is related generally to a locking system for preventing the loosening of threaded fasteners due to vibration, and more particularly to such systems which employ a multi-strand locking wire.

BACKGROUND OF THE INVENTION

Many types of machinery are subject to vibration, which may cause the loosening of threaded fasteners in the machinery. In many applications, such as turbine engines, a loosened fastener can cause catastrophic damage to the machinery. It is therefore necessary to lock the threaded fasteners in the machinery in position so that they can not rotate in a direction which would tend to loosen and disengage them.

One locking system in the prior art utilizes two solid locking wires. Each of the fasteners to be locked has an aperture to receive a locking wire, and has one of the two wires passing through its aperture. The two wires are twisted together between fasteners and tensioned to prevent the fasteners from rotating in the loosening direction. The ends of the two wires are also twisted together and bent into a pigtail shape to prevent separation.

Instead of using two solid wires, a single solid wire may also be used to implement the twisted solid wire locking system. In that case the wire is first threaded through the aperture of the first fastener in the locking sequence. The wire is then doubled back around that fastener and the two halves of the wire are used in the same way as the two wires in the double wire system described above.

The twisted solid wire locking system has many drawbacks. For instance, because the wires must be twisted together during installation, it is very time consuming to install such systems. It is also difficult to maintain uniform tension in the wires. The quality of installation varies greatly due to the dependency on the skill of the operator.

An improved system in the prior art utilizes a single flexible multi-strand wire which is threaded through the aperture of each of the fasteners to be locked together. The wire is placed under tension as it is threaded through the fastener apertures, and the tension is maintained by affixing a crimped-on body on each end of the wire to prevent the ends from going through the terminal fasteners. Tools have been designed for the application of affixing the crimped-on body onto the locking wire. For example, U.S. Pat. No. 5,214,832 to Koehler et al. discloses a hand tool, and U.S. Pat. No. 5,127,144 to Plasse et al. discloses a hydraulic tool. The single flexible wire system has many advantages over the system with twisted solid wires, such as more uniform tension in the wire between fasteners, and much easier installation.

The single flexible wire locking system in the prior art has not been entirely satisfactory, however. In the prior art the crimped-on body on the end of the wire is deformable, but of a relatively thick construction so as to be large enough to interfere with the fastener aperture. To deform the crimped-on body substantially so as to firmly engage the locking wire requires substantial crimping force. In field applications the crimped-on body is often affixed to the locking wire with a hand tool. The high crimping force required increases the effort needed to install the locking system as well as the risk of acquiring carpal tunnel syndrome by workers performing many crimps a day. Power tools such as a crimper using a hydraulic punch are available, but they tend to be heavy and large, therefore less easy to handle than hand tools. The bulkiness of the power tools also makes it more difficult to reach into areas with limited access.

Another problem of the single wire locking system in the prior art is also related to the installation of the crimped-on body. To assure that the body can be properly crimped onto the wire, the axial aperture in the body must be of a size which closely fits the locking wire. The close fit at relatively small dimension with a somewhat flexible wire may make it difficult to insert the wire into the body.

SUMMARY OF THE INVENTION

In view of the foregoing, it is a general object of this invention to provide a locking system which takes advantage of the use of a flexible multistrand locking wire, but which reduces over prior systems the complexity or effort needed to install the system. In that respect, one object of the present invention is to provide a locking system for threaded fasteners utilizing a ferrule which requires reduced crimping force. It is one feature of the present invention to provide a ferrule with a thin walled crimpable end and a second end large enough to interfere with the fastener aperture. Such a ferrule has the advantages of reduced crimping force and reduced weight. It is a further feature of such a ferrule that the crimping force can be further reduced by deforming in the crimping process only small localized areas on the ferrule.

A further object of the present invention is to provide a locking system utilizing a ferrule designed for easier insertion of a locking wire. It is a feature of the present invention to provide a ferrule which comprises a thin walled cylinder with one end smoothly flared out. The flared end which serves the function of interfering with the fastener aperture also facilitates the insertion of the locking wire through the ferrule.

It is a further feature of the invention to provide identification marks on the ferrule used in the system either by using pre-marked ferrules or by marking the ferrule during installation, such as shaping crimped deformation on the ferrule into identification marks.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiment. On the contrary, the intent is to cover all alternatives, modifications, and equivalents included within the spirit and scope of the invention as defined by the appended claims.

Figure 1:
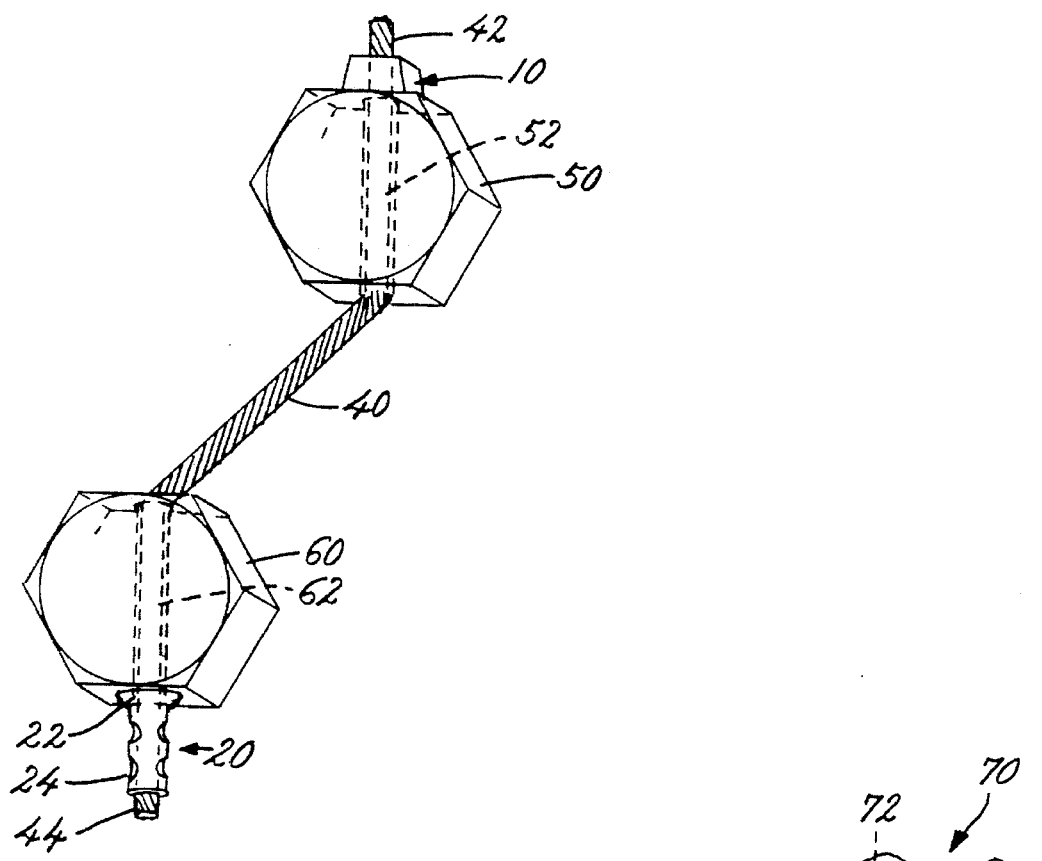
FIG. 1 illustrates two threaded fasteners locked in position with a locking system exemplifying the present invention.

Turning now to the drawings, FIG. 1 shows two threaded fasteners locked in position with a locking system exemplifying the present invention. Each of the threaded fasteners 50, 60 has an aperture 52, 62 which can accept a locking wire 40. The apertures of the fasteners 50, 60 should be of a size sufficiently close to the diameter of the locking wire 40 to adequately receive the locking wire.

The locking system as illustrated in FIG. 1 includes a locking wire 40 and a ferrule 20. The locking wire is a flexible wire having multiple strands of a material with suitable characteristics such as durability and strength. In the preferred embodiment the locking wire is a flexible multistrand steel cable. To the first end 42 of the locking wire is affixed a restraining head 10 which is sufficiently large to interfere with the fastener aperture 52. The second end 44 of the wire is a free end before installation of the locking system. During installation the second end 44 is threaded through the aperture of each of the fasteners 50, 60 in a predetermined direction that when the wire is tensioned the tension in the wire opposes loosening of the fasteners so that they stay locked.

While FIG. 1 shows only two threaded fasteners, more fasteners can be locked with a locking wire according to the same principle by threading the wire through the aperture of each of the fasteners to be locked in the predetermined sequence.

Figure 2:
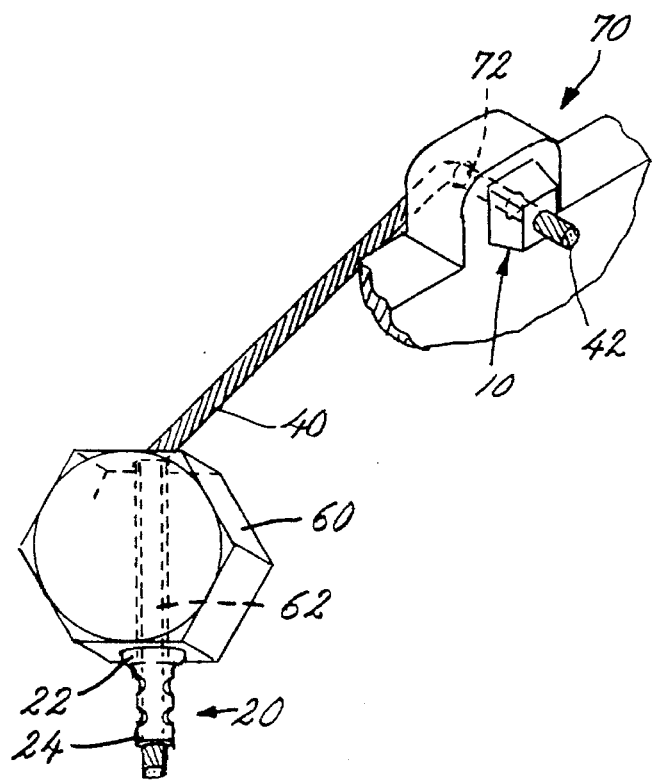
FIG. 2 illustrates a threaded fastener connected to a tab by the locking system, for which the tab serves the function of an anchor.

As illustrated in FIG. 1, each of the fasteners 50, 60 serves as an anchor to which the other fastener is connected by the locking system. Instead of using a fastener as an anchor, an anchor can be a fixed member on the device of which the fasteners are to be locked. For instance, as illustrated in FIG. 2, a fixed tab 70 with an aperture 72 may be used as an anchor.

As shown in FIG. 1, the ferrule in the locking system according to the present invention has two ends 22, 24 of unequal outer dimensions. The larger end 22 is the stop end which is large enough to interfere with the fastener aperture 62. The other end 24 is the barrel end which is generally a section of a thin walled tube. The barrel end is the section of the ferrule for crimping. Having a thin walled barrel end not only allows reduced crimping force but also reduces the weight of the ferrule, which is important in aircraft application.

The ferrule used in the locking system of this invention may have a variety of different configurations all having a stop end and a thin walled barrel end. The different shapes of the two ends assist in installing the ferrule on the wire with the correct orientation, namely with the stop end against the closest fastener. The ferrule may be made of malleable metal or any material with suitable characteristics known to workers skilled in the art.

FIG. 1 shows only one ferrule of the present invention, but more than one of such ferrules can be used in the locking system. For instance, two ferrules can be used in a push-pull arrangement, with one each on the opposite sides of a fastener, and with the stop ends of both ferrules against opposite sides of the fastener.

Figure 3A:
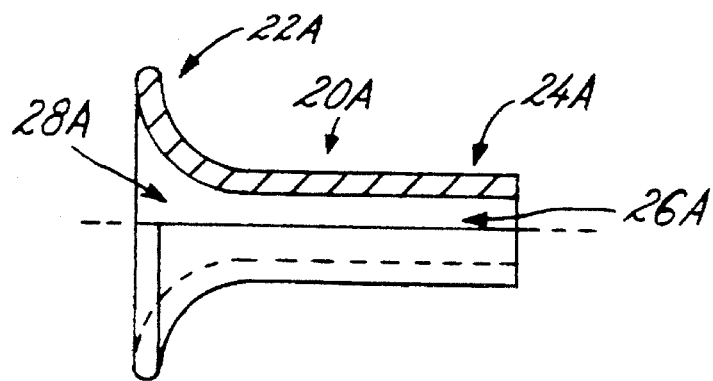
FIGS. 3A, 3B & 3C show partially cut-away side views of three alternative embodiments of the ferrule according to the present invention, all having a substantially uniform cross sectional wall thickness.
Figure 3B:
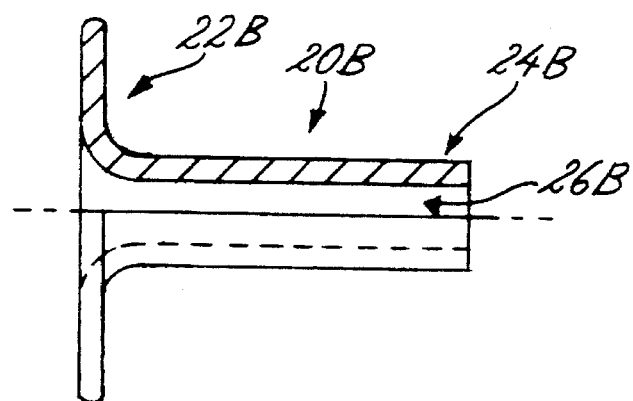
Figure 3C:
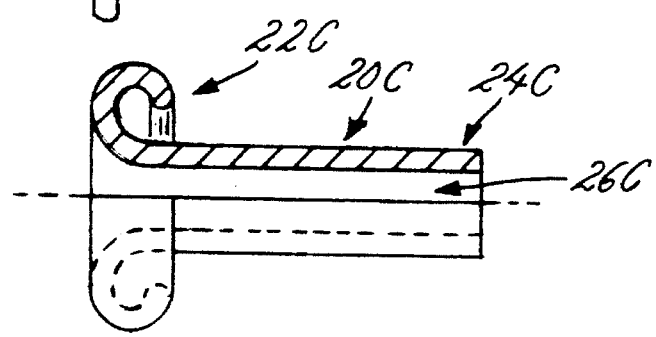

FIGS. 3A–3C show in partially cut-away side views three embodiments of the ferrule according the present invention. All three embodiments have a generally annular cross section and a substantially uniform cross sectional wall thickness from end to end. When used herein, substantially uniform means that the wall thickness shows substantially no local variation and does not change significantly with the outer diameter of the ferrule. In the embodiment shown in FIG. 3A, which is the preferred embodiment, the ferrule 20A has a barrel end 24A smoothly flaring out to the stop end 22A. The ferrule of this design has at least two advantages. The first is the further reduced weight due to the thin wall throughout the ferrule. The second is that the large opening 28 and the flared shape at the stop end 22A facilitates the insertion of the locking wire into the stop end. The flared thin walled ferrule 20A may be made by stamping thin walled cylinders, or by any other method known to persons skilled in the art.

The two embodiments in FIGS. 3B & 3C are examples of alternative variations of the thin walled flare-ended ferrule 20A in FIG. 3A. In one variation as shown in FIG. 3B the stop end 22B of the ferrule 20B is flared out sufficiently to become a thin flange. In the other embodiment which is shown in FIG. 3C the stop end 22C of the ferrule 20C has a rolled edge.

Figure 4:
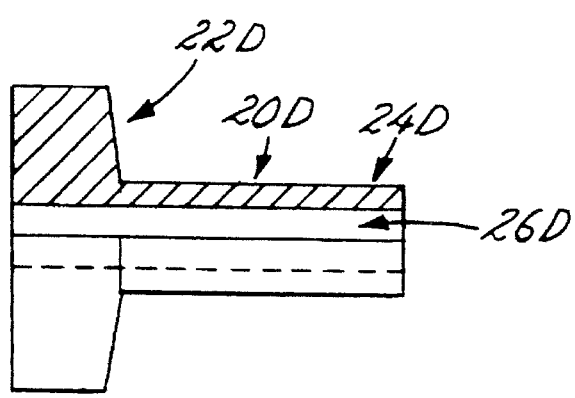
FIG. 4 is a partially cut-away side view of an alternative configurations of the ferrule, the wall thickness of which varies with the outer diameter of the ferrule.

An alternative embodiment of the ferrule which does not have a substantially uniform wall thickness is shown in FIG. 4. The ferrule 20D has a generally uniform axial aperture 26D, and the wall thickness of the ferrule varies with the outer diameter of the ferrule. Such a ferrule may be made, for example, by casting or any other ways known to people skilled in the art.

Figure 5:
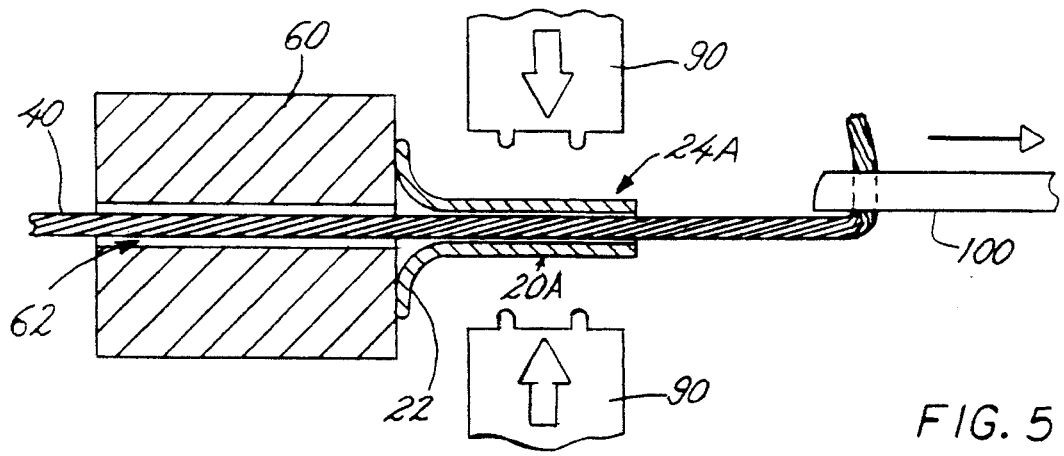
FIG. 5 illustrates in a cross sectional view the installation of the ferrule on the locking wire according to the present invention.

FIG. 5 illustrates the installation of the ferrule on the locking wire to form a complete locking system. The ferrule 20A is put on the wire 40 by inserting the second end 44 of the wire into the stop end 22A so that the stop end faces the fastener 60 which is closest to the second end of the wire. The tensioning member 100 in FIG. 5 illustrates schematically the application of tension to the locking wire. While the wire is tensioned by pulling on the second end 44 of the wire, the stop end 22A is forced into contact with the body of the last fastener 60 and the barrel end 24A is deformed by a crimping tool to secure the ferrule on the wire. After the ferrule is crimped on the locking wire, the excess length of the second end 44 of the wire may be trimmed. The crimping tool, which is schematically illustrated in FIG. 5 as two crimping dies 90, may be either a hand tool or a power tool. The tension in the wire is then maintained between the restraining head on the first end of the wire (not shown in FIG. 5) and the ferrule 20A. The adequate tension in the wire depends on the size of the wire, size of the fastener, and other factors of the application, and may be in the range of 5 to 50 pounds. Higher tension may, of course, be required in certain applications.

Due to the thin wall of the barrel end, crimping force is significantly reduced because the thin wall can be easily deformed to firmly engage the locking wire. The adequacy of the wall thickness at the barrel end depends on whether the material of the ferrule can remain reliably locked in the crimped position. The wall thickness may be reduced to a desired level as long as the ferrule has proper locking ability. For example, the wall thickness may be kept under, e.g., 30 thousandths of an inch. With a sufficiently thin wall, the barrel end may have a diameter small enough that it is insufficient to reliably interfere with the fastener aperture.

Figures 6A, 6B:
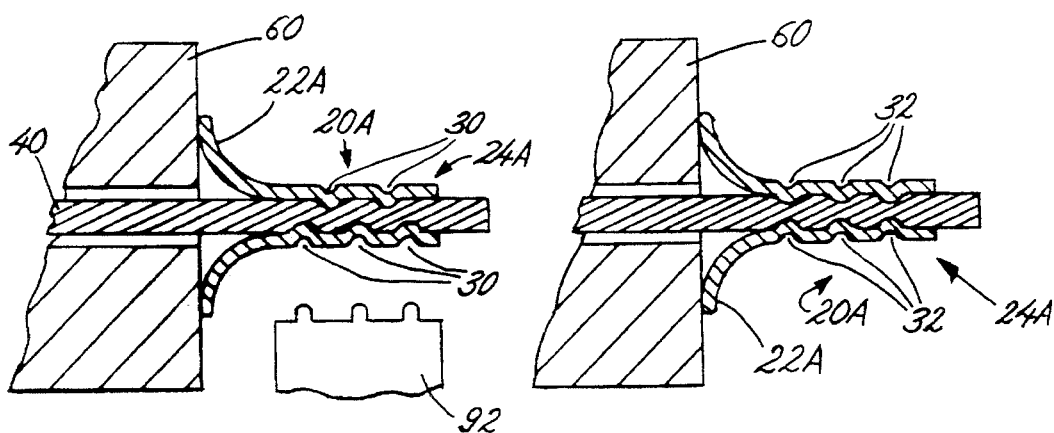
FIGS. 6A & 6B shows in a cross sectional view two different configurations of dimple-like indentations on a thin walled ferrule.

Further reduction of the crimping force and improved reliability of the crimp can be achieved by deforming only small localized areas on the barrel end to form, for example, dimple-like indentations, instead of crimping the full periphery of the barrel end. Depending on the number and size of the localized indentations, the indentations may occupy only a minority surface area of the barrel end. FIGS. 6A & 6B show two examples of such crimps with different configurations of the dimple-like indentations on the barrel end. FIG. 6A also illustrates a crimping die 92 for impressing such dimple-like indentations. It is to be appreciated that deforming small localized areas on the thin walled barrel end 24A is sufficient to affix the ferrule on the multi-strand locking wire. For example, with the configuration of offset lengthwise arrays of dimple-like indentations 30 shown in FIG. 6A, the locking wire 40 would be required to go through a serpentine motion to be pulled out of the ferrule 20A. The indentations can also be distributed in annular arrays on planes perpendicular to the length of the ferrule. A cross sectional view of such a configuration is shown in FIG. 6B. The indentations 32 on the ferrule form pinch points on the inside, requiring the wire to constrict if it is to pass through the pinch points. Other configurations of small-area deformation can be equally effective.

Figure 7:
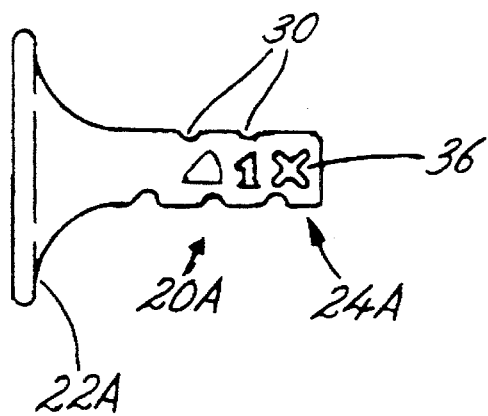
FIG. 7 shows a crimped identification pattern on a ferrule with a flared end.

The ferrule used in the locking system also provides a ready means for incorporating identification marks in the locking system during the installation. The identification marks serves many purposes. For instance, a marked ferrule may serve as a seal to prevent tampering of the locking system. The mark on the ferrule can also be used to indicate the time, location, or the operator of the system installation. The identification marks on the ferrule can be pre-marked before it is installed in the system. For instance, the ferrules may be color coded or stamped with marks when they are manufactured. The identification mark may also be applied to the ferrule during the installation of the locking system. For instance, by using a crimping tool having a crimping die with identification marker, an identification pattern can be impressed on the ferrule in the crimping step. The patterns can be simple shapes or letters or numbers. FIG. 7 shows as an example a flared-ended ferrule with a crimped identification pattern 36 and dimple-like deformations 30 on the barrel end 24A.

Figure 8A:
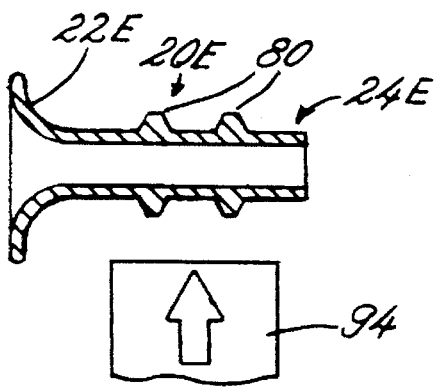
FIGS. 8A & 8B show in cross sectional views an alternative embodiment of a ferrule of the present invention which has annular ridges on its barrel end, before and after crimping.
Figure 8B:
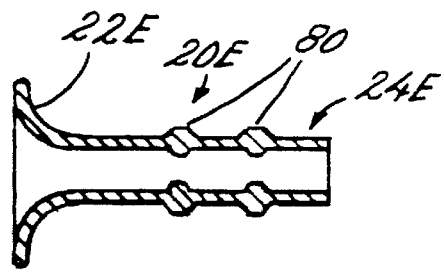

The ferrules shown in FIGS. 3 & 4 have a generally uniform wall thickness at the barrel end. In an alternative configuration, the ferrule may have raised areas on the barrel end instead of a uniform wall thickness. The raised areas may be configured to form, for example, annular ridges on the barrel end. FIG. 8A shows a cross sectional view of such a ferrule 20E with annular ridges 80. For a ferrule with raised areas on the barrel end, a crimping tool with a large crimping surface 94 is used, in contrast to the small-area crimping shown in FIGS. 6A & 6B. As shown in FIG. 8B, crimping force deforms the raised areas 80 toward the axis of the ferrule and forms pinch points on the inside of the ferrule 20E for engaging the lock wire.

As shown in FIG. 1, the first end 42 of the locking wire 40 has a restraining head 10 affixed to it. The restraining head 10 may be a crimped-on bead which is of a size sufficient to interfere with the fastener aperture 52. Such a crimped-on head can be factory installed.

The restraining head may also be another ferrule like the ferrule 20 on the second end 44 of the wire. To form a restraining head, the ferrule is generally crimped on the first end 42 of wire with the stop end facing the second end of the wire 44. However, if the aperture in the fastener 50 is large enough to accept the barrel end, the ferrule can be crimped on the wire with a reversed orientation, so that after the wire is tensioned the barrel end is hidden inside the fastener, thereby providing minimum protrusion.

Figure 9:
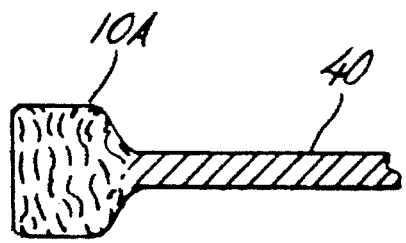
FIG. 9 illustrates a restraining head which comprises a deformed section of the locking wire.

The restraining head may also comprise a localized deformed section of the wire. FIG. 9 illustrates such a head 10A, which can be formed by working the end section of the wire, or by any other ways known to people skilled in the art. Further processing of the formed head, such as welding or soldering, may be performed to enhance the strength of the formed head.

It will now be appreciated that what has been provided is an improved locking system for threaded fasteners utilizing a locking wire and a ferrule having a stop end and a thin walled crimpable barrel end. In the preferred embodiment the ferrule is a thin walled cylinder with one end flared out to form a stop end which facilitates insertion of the locking wire. The thin wall of the barrel end allows correspondingly reduced crimping force. Further reduction of crimping force is achieved by deforming only small localized areas on the barrel end. The ferrule can also be marked for identification. The identification mark may be applied before system installation, or be applied during installation, such as by crimping.

What is claimed is:

1. A locking system for connecting at least one threaded fastener to an anchor for preventing loosening of the fastener, each of the anchor and the fastener having a body and a lock wire aperture therethrough of a size sufficient to closely receive a lock wire, the system comprising:

a flexible multi-strand locking wire having first and second ends, the first end of the locking wire having a restraining head of a dimension sufficient to interfere with the lock wire apertures, the wire being threaded through each of the lock wire apertures in a predetermined direction, and a ferrule having a stop end, a barrel end and an axial aperture between said ends, the stop end having a dimension sufficient to interfere with the lock wire apertures, the barrel end having a dimension substantially smaller than the stop end so as to reduce the force required to crimp the barrel end, the second end of the locking wire being threaded through the ferrule with the stop end facing the lock wire aperture closest to the second end of the wire, the locking wire being tensioned between the restraining head on the first end and the ferrule on the second end, the tension in the locking wire being maintained by crimped deformations impressed on the outside of the barrel end creating pinch points on the inside of the barrel which grip the locking wire, the barrel end of the ferrule and the axial aperture of the ferrule defining a thin wall section adapted for a crimped connection of the ferrule to the locking wire.

2. A locking system as in claim 1, wherein the anchor comprises a second said fastener, the locking wire being threaded through the lock wire apertures of the first and second fasteners.

3. A locking system for connecting at least one threaded fastener to an anchor for preventing loosening of the fastener, each of the anchor and the fastener having a body and a lock wire aperture therethrough of a size sufficient to closely receive a locking wire, the system comprising.:.
   a flexible multi-strand locking wire having first and second ends, the first end of the wire having a restraining head of a dimension sufficient to interfere with the lock wire apertures, the wire being threaded through each of the lock wire apertures in a predetermined direction, and
   a ferrule having a stop end, a barrel end and an axial aperture between said ends, the ferrule being of malleable metal having a cross sectional wall thickness which is substantially uniform from end to end, the stop end having a dimension sufficient to interfere with the lock wire apertures, the barrel end having a dimension substantially smaller than the stop end so as to reduce the force required to crimp the barrel end, the second end of the locking wire being threaded through the ferrule with the stop end facing the lock wire aperture closest to the second end of the wire, the locking wire being tensioned between the restraining head on the first end and the ferrule on the second end, the tension in the locking wire being maintained by said crimped deformations on the barrel end engaging the strands of the locking wire, the barrel end of the ferrule and the axial aperture of the ferrule defining a thin wall section adapted for a crimped connection of the ferrule to the locking wire.

4. A locking system as in claim 3, wherein the ferrule has a barrel end smoothly flaring to a stop end to a dimension sufficient to interfere with the lock wire apertures, the axial aperture of the ferrule flaring at said stop end to facilitate insertion of the locking wire.

5. A locking system as in claim 4, wherein the wall thickness of the barrel end is less than 30 thousandths of an inch.

6. A locking system as in claim 4, wherein the dimension of the barrel end of the ferrule has a diameter which is insufficient to reliably interfere with the lock wire apertures.

7. A locking system as in claim 1, wherein the barrel end of the ferrule has a substantially uniform wall thickness and the crimped deformation of the ferrule comprises at least one array of localized indentations occupying a minority surface area of the barrel, the total area and positioning of the indentation being sufficient to maintain said connection between the ferrule and the locking wire.

8. A locking system as in claim 1, wherein the ferrule bears an identification mark pre-marked before the system is installed.

9. A locking system as in claim 1, wherein the ferrule bears an identification mark comprising crimped deformation on the ferrule shaped to provide an identification pattern.

10. A locking system as in claim 1, wherein the restraining head on the first end of the locking wire comprises a second said ferrule, said ferrule being crimped on the wire and drawn into contact with the body closest to the first end of the wire by the tension in the locking wire.

11. A locking system as in claim 1, wherein the restraining head on the first end of the wire includes a localized deformed section of the locking wire of adequate size to interfere with the lock wire apertures.

12. A locking system as in claim 1, wherein the ferrule is of malleable metal having on the barrel end raised areas which upon crimping are pressed toward the axis of the ferrule to create deformation in the ferrule wall for engaging the locking wire.

13. A locking method for connecting at least one threaded fastener to an anchor for preventing loosening of the fastener, each of the anchor and the fastener having a body and a lock wire aperture therethrough of a size sufficient to closely receive a locking wire, the method comprising the steps of:
   providing a flexible multi-strand locking wire having a first end with a restraining head and a free second end,
   threading the second end through each of the lock wire apertures of the anchor and the fastener in a predetermined direction,
   threading the second end of the wire through an axial aperture in a ferrule, the ferrule having a stop end and a barrel end, the stop end having a dimension sufficient to interfere with the lock wire apertures, the barrel end having a thin wall section adapted for a crimped connection of the ferrule to the locking wire.., orienting the ferrule so that the wire enters the ferrule at the stop end,
   tensioning the locking wire by pulling the second end while forcing the stop end of the ferrule against the body closest to the second end of the wire, so that the restraining head on the first end of the locking wire is pulled against the body closest to the first end,
   while holding the tension in the wire, crimping the barrel end of the ferrule to impress crimped deformations on the outside of the barrel end which form pinch points on the inside of the barrel end to grip the locking wire and maintain the tension therein, the barrel end having a dimension substantially smaller than the stop end to correspondingly reduce the force necessary to perform the crimping step.

14. A locking method as in claim 13, wherein the anchor is a second said threaded fastener, and the step of threading threads the locking wire through the lock wire apertures of the first and second fasteners.

15. A locking method as in claim 13, wherein the step of providing a locking wire includes threading the first end into a second said ferrule, and crimping the barrel end of the second ferrule to form the restraining head.

16. A locking method as in claim 13, wherein the ferrule is of malleable metal having on the barrel end raised areas which are pressed in the crimping step toward the axis of the ferrule to deform the barrel wall to engage the locking wire.

17. A locking method as in claim 13, wherein the ferrule is a thin-walled cylinder flared at one end to produce a thin-walled barrel end smoothly flaring into the stop end, and the step of threading uses the aperture in the flared stop end to guide the locking wire into the ferrule.

18. A locking method as in claim 17, wherein the ferrule has an identification mark pre-marked before being installed on the locking wire.

19. A locking method as in claim 17, wherein the crimping step deforms localized areas of the barrel end around less than the entire periphery thereof to further reduce the required crimping force.

20. A locking method as in claim 19, wherein the crimping step deforms the barrel end to impress an identification mark on the ferrule.

* * * * *